United States Patent
Malone

(10) Patent No.: US 12,417,865 B2
(45) Date of Patent: Sep. 16, 2025

(54) ROTARY POSITION SENSOR WITH INTEGRATED POTENTIOMETER

(71) Applicant: COOPER-STANDARD AUTOMOTIVE INC, Northville, MI (US)

(72) Inventor: David S. Malone, Attica, MI (US)

(73) Assignee: Cooper-Standard Automotive, Inc., Northville, MI (US)

( * ) Notice: Subject to any disclaimer, the term of this patent is extended or adjusted under 35 U.S.C. 154(b) by 374 days.

(21) Appl. No.: 17/947,442

(22) Filed: Sep. 19, 2022

(65) Prior Publication Data

US 2024/0096528 A1 Mar. 21, 2024

(51) Int. Cl.
*H01C 10/32* (2006.01)
*G01D 5/165* (2006.01)
*G01D 11/24* (2006.01)
*H01C 10/14* (2006.01)

(52) U.S. Cl.
CPC ............ *H01C 10/32* (2013.01); *G01D 5/165* (2013.01); *G01D 11/245* (2013.01); *H01C 10/14* (2013.01)

(58) Field of Classification Search
CPC ........ H01C 10/32; H01C 10/14; G01D 5/165; G01D 11/245
See application file for complete search history.

(56) References Cited

U.S. PATENT DOCUMENTS

| | | | | |
|---|---|---|---|---|
| 4,355,293 A * | 10/1982 | Driscoll | ................. | H01C 10/30 338/183 |
| 5,133,321 A * | 7/1992 | Hering | ...................... | F02D 9/02 338/153 |
| 5,828,290 A | 10/1998 | Buss et al. | | |
| 6,029,510 A | 2/2000 | Nakaie et al. | | |
| 6,031,448 A * | 2/2000 | Starkweather | ....... | G01D 11/245 338/162 |
| 6,040,756 A * | 3/2000 | Kaijala | .................. | H01C 10/34 338/160 |
| 10,879,722 B2 | 12/2020 | Isfeldt | | |

FOREIGN PATENT DOCUMENTS

| | | |
|---|---|---|
| EP | 1111628 A2 | 6/2001 |
| EP | 1111628 A3 | 3/2005 |
| EP | 0314150 B1 | 10/2008 |
| EP | 2184746 B1 | 6/2010 |
| JP | 6450827 B1 | 1/2019 |
| JP | 2021136312 A | 9/2021 |

OTHER PUBLICATIONS

Search Report for EP23198380 dated Feb. 12, 2024.

* cited by examiner

*Primary Examiner* — Kyung S Lee
(74) *Attorney, Agent, or Firm* — Paschall & Associates, LLC; James C. Paschall; Anthony Miologos

(57) ABSTRACT

A rotary position sensor for measuring the position of a rotating shaft comprises an upper housing and a lower housing arranged to be attached to the upper housing. A barrel is rotationally mounted to the attached upper and lower housings and coupled to the shaft is arranged to be positionable within the attached upper and lower housings by the shaft. A potentiometer component is mounted to the barrel and to an electrical sub-assembly that measures the position of the barrel and in response generates a position signal.

20 Claims, 6 Drawing Sheets

ROTARY POSITION SENSOR WITH INTEGRATED POTENTIOMETER

TECHNICAL FIELD

This disclosure is generally directed to position sensors. More specifically, it relates to a rotary position sensor with an integrated potentiometer that generates signals representing the rotational or angular position of an actuator shaft.

BACKGROUND

Rotary actuators have many applications. For example, in the automotive industry, rotary actuators may be used in valves for switching fluid paths through a heat dissipating system for cooling the various heat producing components of the vehicle. Rotary actuators can also be used to control air flow through ventilation systems used to heat and cool a vehicle's passenger cabin. In the above described applications, an electrically driven actuator motor rotates a shaft that moves a component of the controlled device connected to the shaft. For example, a rotary valve can be connected to the actuator shaft to switch fluid flow between an inlet and a plurality of outlets of the fluid valve. The actuator motor is operated to move the rotary valve components to switch the flow of fluid between the inlet and one or more outlets using control signals sent to the actuator from control circuitry. A rotary position sensor can be used to develop and send signals back to the control circuitry as feedback confirming the position of the actuator.

SUMMARY

This disclosure relates to a rotary position sensor with an integrated potentiometer that generates signals representing the rotational or angular position of an actuator shaft.

In a first embodiment, a position sensor is disclosed for use with a rotating shaft. The position sensor comprises a housing and a barrel rotationally mounted in the housing coupled to the shaft and positionable in the housing by the shaft. A potentiometer component is mounted to the barrel and an electrical sub-assembly mounted to the housing is electrically connected to the potentiometer component.

In a second embodiment, an assembly for measuring the position of a rotating shaft is disclosed comprising, an upper housing; a lower housing arranged to be attached to the upper housing and a barrel rotationally mounted to the attached upper and lower housings and coupled to the shaft. The barrel is positionable within the attached upper and lower housings by the shaft. A potentiometer component is mounted to the barrel and an electrical sub-assembly is mounted to the second housing and electrically connected to the potentiometer component that measures the position of the barrel and in response generates a position signal.

In a third embodiment a rotary position sensor assembly for measuring the position of a rotating shaft is disclosed comprising, a lower housing and a barrel mounted to the shaft and placed in a lower housing. An upper housing is attached to the lower housing that rotatably supports the barrel between the upper and lower housings. A potentiometer component is mounted on the barrel and is rotatable with the barrel. An electrical sub-assembly is mounted to the lower housing and is electrically connected to the potentiometer component that together generate a position signal that measures the position of the barrel when the barrel is rotated by the shaft.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIGS. 1-6 of the present invention provides a rotary position sensor 10 for use with a mechanically or electrically driven rotating device such as for example, a rotating shaft of an actuator. The rotary position sensor 10 when attached to the shaft of an actuator (not shown) is used to sense the rotational or angular position of the shaft and to generate electrical signals using an integrated potentiometer that is indicative of its position. Control circuitry (not shown) receives the position signals as feedback signals to confirm the position of the shaft. An example of an applications using a rotary actuator includes rotary valves that use an electrical actuator to switch the flow of a fluid through the valve. The valve actuator operates to move rotary valve components to switch the flow of fluid through various passages in the valve using control signals from the control circuitry. However, it should be noted that the present invention has broad applicability and is not limited to only the application just described.

Figure 1:
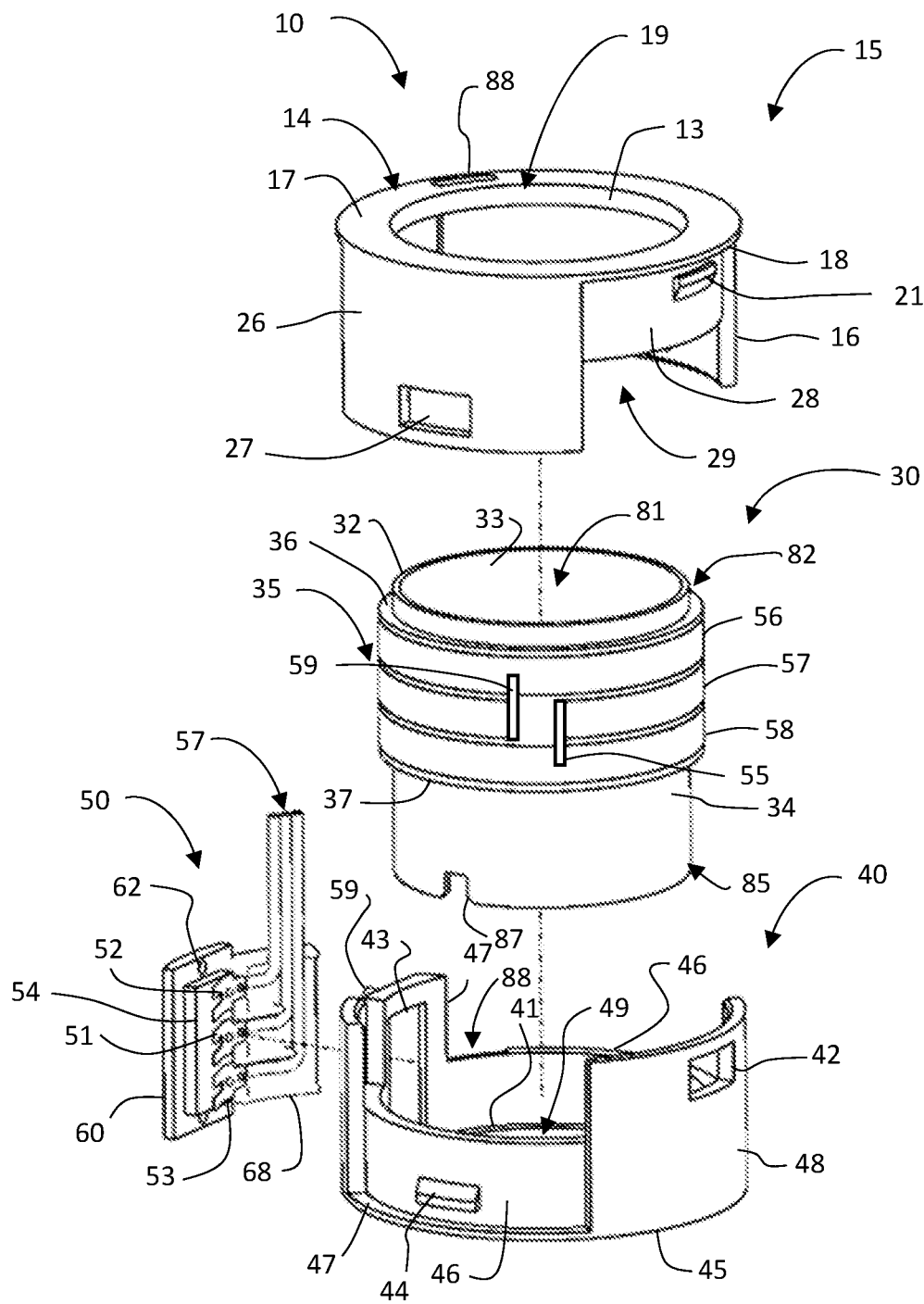
FIG. 1 is a perspective illustration of the rotary position sensor with an integrated potentiometer in an unassembled condition according to an embodiment of the present disclosure.

FIG. 1 of the include drawings illustrates a first embodiment of an example rotary position sensor 10 of the present disclosure. The rotary position sensor 10 is comprised of an assembly having an upper housing 15, a barrel 30, a lower housing 40 and an electrical sub-assembly 50. The upper housing 15, barrel 30 and lower housing 40 may be formed as unitary structures using any thermoplastic material suitable for the application in which the sensor 10 will be used. For example, if the sensor is used in heat transfer applications using a coolant fluid, a glycol resistant thermoplastic material is used.

The upper housing 15 is generally cylindrical in cross-section and includes an annular top portion 14 having a top surface 17 and a bottom surface 18. The top portion 14 extends about the periphery of a centrally located opening 19 that extends through top surface 17 to the bottom surface 18. The opening 19 further includes a shoulder 13 extending about opening 19. A first arcuate outer wall 26 extend from an outer peripheral edge of the top surface 17. A second arcuate outer wall 16 extends from the outer peripheral edge of the top surface 17 along an edge opposite from outer wall 26. An arcuate inner wall 28 extends from the bottom surface 18 of the top portion 14, located inward from and between outer walls 16 and 26. A cavity 29 is defined between inner surfaces of the outer walls 16 and 26 and the inner surface of wall 28. The cavity 29 extends axially through upper housing 15 to opening 19. A lower portion of outer wall 26 and 16 includes a latch opening 27 that extends through each outer wall 16 and 26. The inner wall 28 includes a wedge shaped latching member 21 extending from an outer surface of wall 28. The top surface 17 of top portion 14 includes an aperture 88 for accepting wire conductors 57 therethrough.

The lower housing 40 is generally cylindrical in cross-section and includes an annular bottom portion having a top surface 47 and a bottom surface 45. The bottom surface 45 extends about the periphery of a centrally located opening 49 extending through top surface 47 to the bottom surface 45. The opening 49 further includes a shoulder 41 extending about opening 49. A first pair of arcuate outer walls 47 and 48 extend from an outer peripheral edge of the bottom portion top surface 47. Each outer wall 47 and 48 is located along opposite edges of the bottom portion. A second pair of arcuate inner walls 46 extend from the top surface 47 of the bottom portion, located inward from and between outer walls 47 and 48. An upper portion of outer wall 48 includes a latch opening 42 that extends through outer wall 48. Outer wall 47 includes an opening 43 that extends through outer wall 47 and is arranged to accept portions of the electrical sub-assembly 50 therethrough. Each inner wall 46 includes a wedge shaped latching member 44 extending from an outer surface of each wall 46.

The barrel 30 includes a cylindrical wall 32 having an outer surface 34 and an inner surface 33. The inner surface 33 encompassing a passage 81 extending axially through the barrel 30. The barrel 30 includes a raised cylindrical potentiometer component 35 extending circumferentially about the outer surface 34 of barrel 30. The potentiometer component 35 located on barrel 30 so as to form an upper skirt 82 and a lower skirt 85. An upper portion of the potentiometer component 35 forms an upper bearing surface 36 that is radially perpendicular to the upper skirt 82. A lower portion of component 35 forms a lower bearing surface 37 that is radially perpendicular to the lower skirt 85. Potentiometer component 35 is arranged to have electrically conductive and electrically resistive bands attached circumferentially about its outer surface. The bands include conductor bands 56 and 58 and a resistor band 57. The resistor band 57 is electrically connected to the conductor bands 56 and 58 via end connections 55 and 59. The bands 56, 57 and 58 are placed on the potentiometer component in a spaced relationship to the other and are electrically interconnected by end connections 55 and 59. Conductor band 56 is electrically connected to resistor band 57 through end connection 59, while conductor band 58 is electrically connected to resistor band 57 via end connection 55. With a positive electrical potential applied to conductor band 56 and a negative electrical potential applied to conductor band 58 an electrical current would flow from conductor band 56 and end connection 59 through the resistor band 57 and end connection 55 to the conductor band 58.

The conductor bands 56 and 58 may be formed from electrically conductive film and attached to component 35 using a suitable adhesive. Similarly, the resistor band 57 may be formed from an electrically resistor film and attached to component 35 also using a suitable adhesive. The end connections 55, 59 are attached to conductive bands 56 and 57 and resistor band 57 using any appropriate electrical bridging technique, such as for example, attaching a metalized film or using solder to form an electrical bridge between resistor band 57 and the conductor bands 56, 58. The bands 56, 57 and 58, as well as the end connection 59, 55 may also be formed directly on component 35 by depositing conductive and resistive inks directly on the outer surface of component 35 using a film deposition process.

Figure 4:
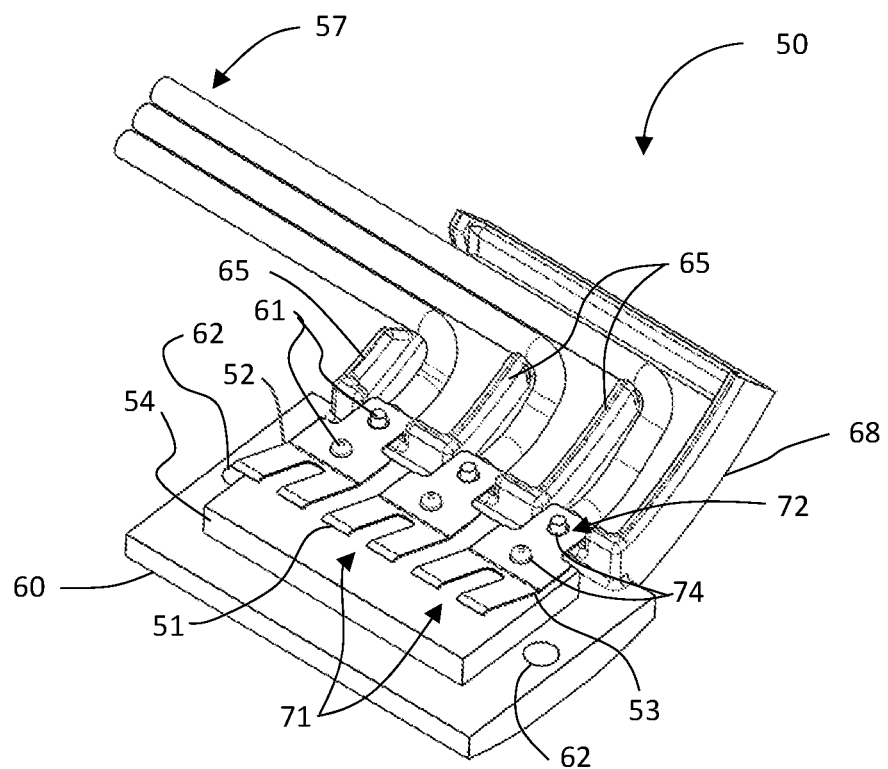
FIG. 4 is a perspective illustration of the electrical sub-assembly of the rotary position sensor with an integrated potentiometer according to an embodiment of the present disclosure.
Figure 5:
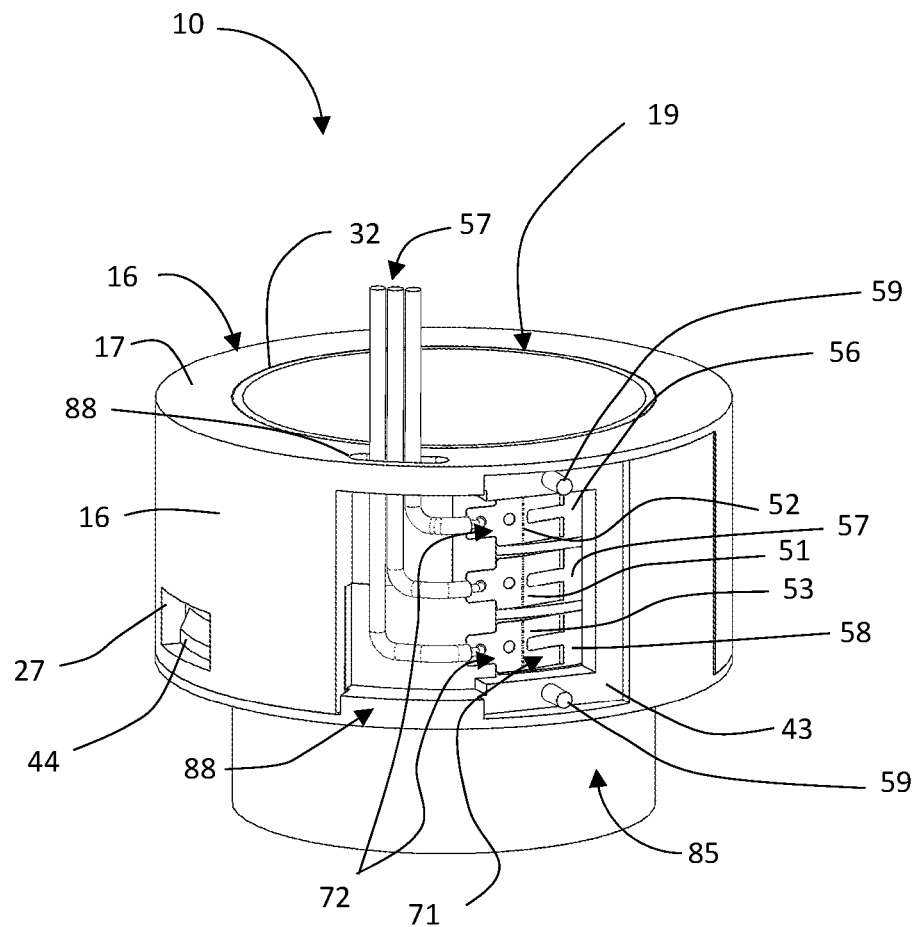
FIG. 5 is a perspective illustration of the assembled rotary position sensor with an integrated potentiometer of FIG. 2 with the first and second cover portions removed to show the arrangement of the electrical sub-assembly according to an embodiment of the present disclosure.

With reference to FIGS. 1, 4 and 5 the electrical sub-assembly 50 of the present disclosure is comprised of a first cover portion 60 having an inner surface that includes a terminal mounting block 54. The terminal mounting block 54 is arranged to receive and mount metal terminal contacts 51, 52 and 53 on the mounting block 54. The terminal contacts 51, 52, and 53 each include a bifurcated wiper portion 71 extending from a planar mounting portion 72. The mounting portion 72 of each terminal contact 51, 52 and 53 is attached to terminal block 54 using stakes 61 that extend from the mounting block 54 and are accepted through holes 74 on each mounting portion 72. Each terminal contact 51, 52 and 53 is held on the mounting block 54 by deforming each stake 61, using any known method in the art to expand each stake 61 over its respective hole 74 to cause the expanded material of the stake 61 to capture and retain the mounting portion 72 to the mounting block 54. Upon mounting of a terminal contact to mounting block 54 the wiper portion 71 is oriented upward and away from the mounting block 54. A second cover portion 68 extends from an end of the first cover portion 60 and includes a wire trough formed on its interior surface by wall segments 65. The wall segments 65 form individual compartments that house and guide each one of the wire conductor 57 to a respective terminal contact. Each conductor may be further secured to each individual compartment by applying a retaining material, such as for example and adhesive or potting compound on a bottom surface of each compartment and laying or embedding each conductor in the retaining material. Each of the wire conductors 57 connects to an individual mounting portion 72 using any suitable technique for mounting wires to electrical terminals, such as for example, a crimping sleeve. The first cover portion 60 further includes a pair of mounting holes 62 that extend through the cover to accept therein a pair of stakes 59, that extend from the lower housing exterior wall 47. First and second cover portions 60 and 68, terminal mounting block 54, stakes 61 and wall segments 65 are formed using a suitable thermoplastic material.

Figure 2:
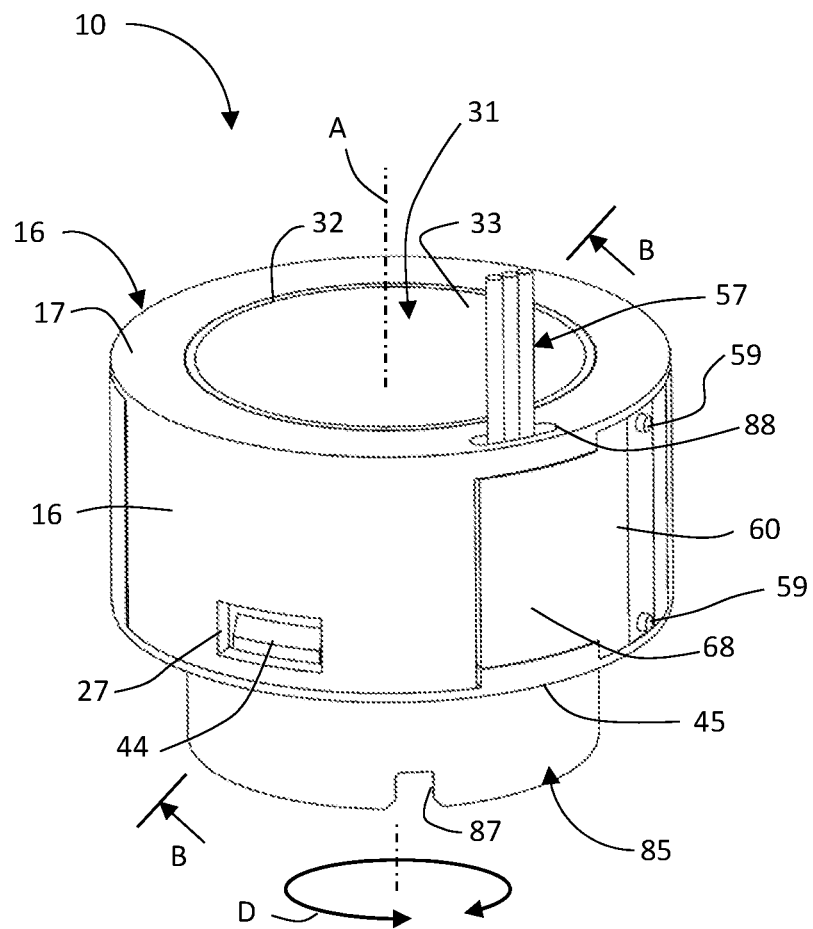
FIG. 2 is a perspective illustration of the rotary position sensor with an integrated potentiometer of FIG. 1 in an assembled condition according to an embodiment of the present disclosure.
Figure 3:
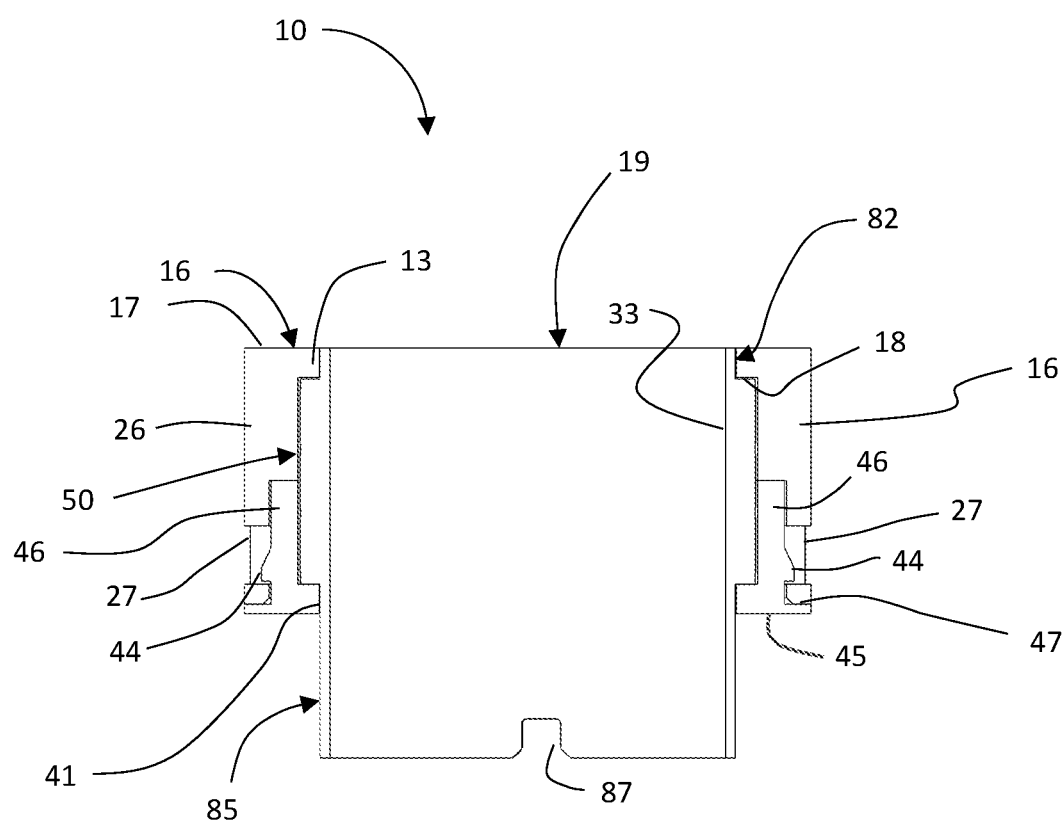
FIG. 3 is a sectional illustration of the rotary position sensor with an integrated potentiometer of FIG. 2 along section lines B-B according to an embodiment of the present disclosure.

With reference to FIGS. 1-3, the rotary position sensor 10 is assembled by installing barrel 30 into lower housing 40 with skirt 85 through opening 49 until lower bearing surface 37 rests on shoulder 41. With the bearing surface 37 resting the shoulder 41 the lower skirt 85 extends through opening 49 and bottom surface 45. The upper housing 15 is then aligned to lower housing 40, by aligning outer walls 26 and 16 of the upper housing 15 to interior walls 46 of the lower housing 40. As illustrated in FIGS. 1 and 3, outer walls 26 and 16 of the upper housing 15 are arranged to slide over interior walls 46 of the lower housing 40. Additionally, outer wall 48 of the lower housing 40 slides over inner wall 28, thereby nesting the outer walls 26 and 16 to inner walls 46 and the outer wall 48 inner wall 28.

The upper housing 15 is pushed into the lower housing 40 until a respective latch opening 27 makes a snap-fit capture of a respective latching member 44. Similarly latch opening 42 makes a snap-fit capture of latching member 21. When fully installed, the barrel 30 top bearing surface 36 rotationally travels against a bottom surface of shoulder 13 with upper skirt 82 supported against shoulder 13. The lower bearing surface 37 rotationally travels against the top surface of shoulder 41 of the lower housing 40, as is illustrated in FIG. 3. The upper skirt 82 centrally positions the barrel 30 in opening 19. The upper skirt 82 extends through opening 19 with wall 32 positioned even with the top surface 17. A bottom surface of each wall 26 and 16 rests on surface 47 of the lower housing 40 while a top surface of outer walls 47 and 48 rest against the bottom surface 18 of the upper housing 15. The assembled upper housing 15, barrel 30 and lower housing 40 of the rotary position sensor 10 is shown in FIG. 2 and in section drawing in FIG. 3.

As illustrated in FIG. 2, barrel 30 is positioned to freely rotate within the installed upper and lower housings 15 and 40 along axis A in directions D. A rotational force applied to the lower skirt 85 of the barrel 30, such as for example by installing the shaft of an actuator onto the inner surface 33 of passage 81 will rotate the barrel 30 as the actuator shaft is rotated. The lower skirt 85 may also be installed into a hollow or tubular shaft (not shown) by inserting outer surface 34 of the lower skirt 85 into the tubular shaft. A notch 87 is provided on the skirt 85 to accept a key member (not shown) extending from the actuator shaft. The notch accepting the key member therein to identify a known position on the actuator shaft.

With reference to FIGS. 5, the electrical sub-assembly 50 is shown installed into the assembled upper and lower housing 15, 40. FIG. 5, is illustrated with cover portion 60 and 68 removed to illustrate the positioning of the electrical sub-assembly 50 within opening 43 of outer wall 47. Mounting block 54 and contacts 51, 52 and 53 extend through opening 43 toward the barrel 30 of potentiometer component 35. Each wiper portion 71 of each terminal contact 51 and 53 makes a mechanical as well as an electrical contact with a respective band of the potentiometer component 35. For example, the wiper portion 71 of terminal contact 52 makes an electrical contact with conductor band 56, the wiper portion 71 of terminal contact 53 makes an electrical contact with conductor band 58 and the wiper portion 71 of terminal contact 51 makes an electrical contact with resistor band 57. Since the wiper portions 71 of each terminal contact 51, 52 and 53 is biased toward its respective band a mechanical spring pressure is applied by the wiper portion 71 to the band, thereby maintaining a consistent electrical connection between the terminal contact and its respective band as the barrel 30 is rotated. The second cover portion 68 with the wire conductors 57 is installed on area 88 next to inner wall 46. The conductor wires 57 are routed through the upper housing 15 exiting aperture 88. The first cover portion 60 and its attached second cover portion 68 are retained to the upper housing by deforming stakes 59 extending through holes 62 of the first cover portion 60.

The bands 56, 57 and 58 of potentiometer component 35 work with the terminal contacts 52, 51 and 53 respectively, to produce an angular or rotational potentiometer that senses the position of a rotating shaft. A direct current (DC) reference voltage applied to terminal contacts 52, 53 via electrical wire conductors 57 are coupled to conductor bands 56 and 58 respectively via their wiper portions 71. The DC reference voltage is electrically connected to the resistor band 57 via end connections 55 and 59 as explained above. An output voltage signal is developed by the resistor band 57 that is electrically coupled to terminal contact 51 via its wiper portion 71. Rotational displacement of the barrel 30 causes the resistance value sensed by terminal contact 51 between the two end connections 55, 59 to change. The electrical resistance sensed by terminal contact 51 has a proportional relationship between the actual position of terminal contact 51 on the resistor band 57 and a resistance value. The resistance value is output as a feedback signal to a control circuit indicating the position of the barrel 30 and therefore the position of the shaft of the actuator attached to the rotary position sensor 10.

Figure 6:
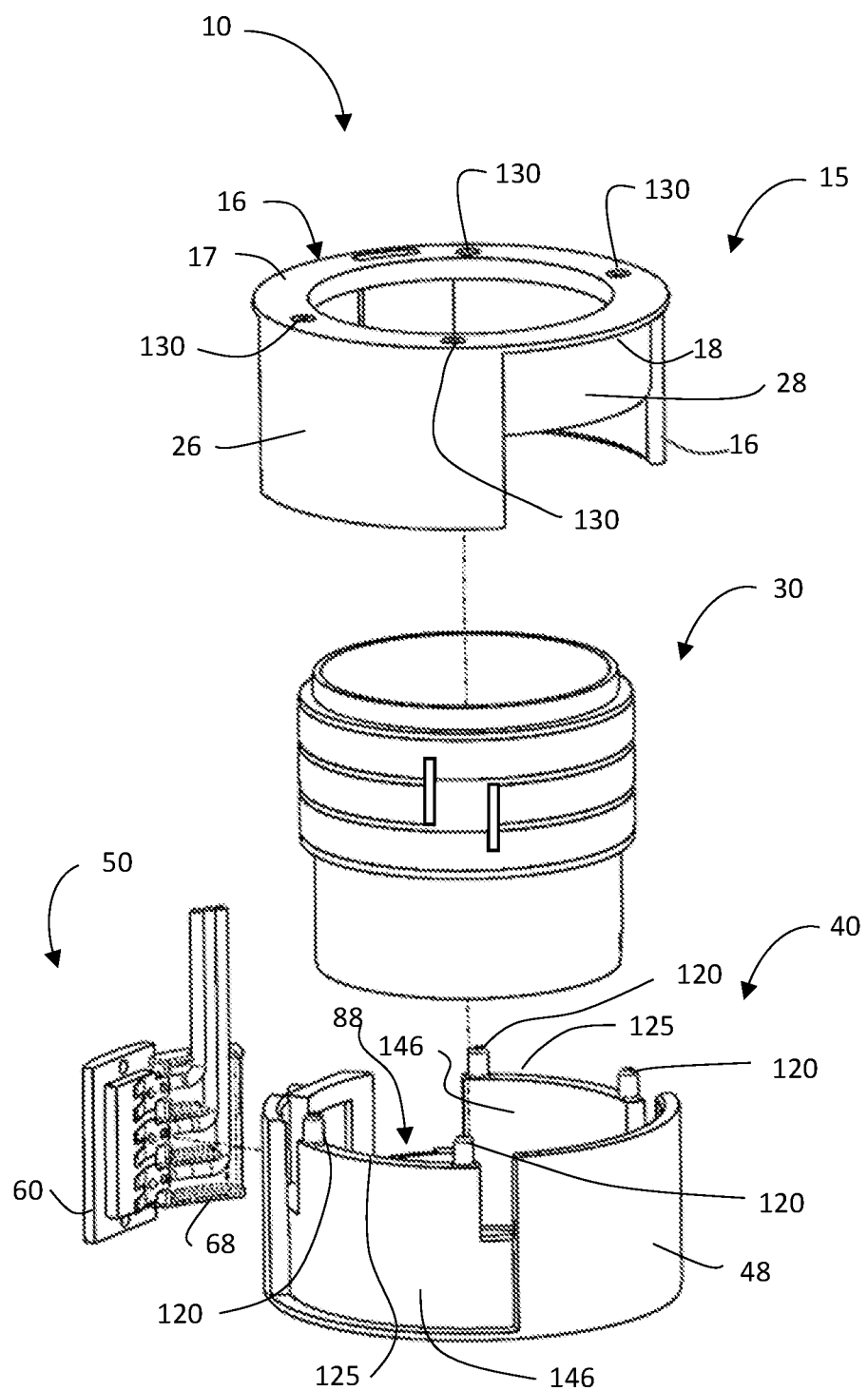
FIG. 6 is a perspective illustration of the rotary position sensor with an integrated potentiometer in an unassembled condition according to another embodiment of the present disclosure.

With reference to FIG. 6 an alternative embodiment is shown for attaching the upper housing 15 to the lower housing 40. In the second embodiment a plurality of mounting stakes 120 extend from a top surface 125 of walls 146. A plurality of mounting holes 130 axially aligned to mounting stakes 120 are located on the top portion 16 of the upper housing 15. The mounting holes 130 extend through the top portion 16 from top surface 17 to the bottom surface 18. The barrel 30 is installed in the lower housing 40 as was explained above and the outer walls 26 and 16 of the upper housing 15 are aligned to interior walls 146 of the lower housing 40. Outer walls 26 and 16 of the upper housing 15 slide over interior walls 146 of the lower housing 40. Additionally, outer wall 48 of the lower housing 40 slides over inner wall 28, thereby nesting the outer walls 26 and 16 to inner walls 146 and the outer wall 48 to inner wall 28.

The upper housing 15 is pushed into the lower housing 40 until a respective mounting stake 120 is accepted by and extends through a respective mounting hole 130. The mounting stakes 120 are then partially deformed using a tool or by the application of heat that attaches and retains the lower housing 40 to the upper housing 15. The electrical sub-assembly 50 can next be installed as explained above to complete the rotary position sensor 10.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A position sensor for a rotating shaft, comprising:
   a housing;
   a barrel rotationally mounted in the housing and coupled to the shaft and positionable in the housing by the shaft;
   a potentiometer component having at least a resistive band attached to an outer surface of the barrel; and
   an electrical sub-assembly mounted to the housing and electrically connected to the potentiometer component.

2. The position sensor of claim 1, wherein the housing comprises:
   an upper housing including a top portion and a pair of outer walls extending from an outer edge of the top portion and at least one inner wall located inward from and between the pair of outer walls and a cavity defined by the pair of outer walls and the at least one inner wall; and
   a lower housing including a bottom portion and a first outer wall extending from an outer peripheral edge of the lower housing and a pair of inner walls extending from the bottom portion located inward from the first outer wall,
   wherein the upper housing is arranged to be installed on the lower housing by engaging the pair of outer walls of the upper housing to the pair of inner walls of the lower housing and the first outer wall of the lower housing to the at least one inner wall of the upper housing causing the cavity to extend through the installed upper and lower housings.

3. The position sensor of claim 2, wherein:
   the pair of upper housing outer walls each include a latch opening and the at least one upper housing inner wall includes a latch member; and
   the lower housing first outer wall includes a latch opening and the pair of lower housing inner walls each include a latching member,
   wherein the upper housing latch member engages the lower housing latch opening, and each lower housing latch member engages a respective upper housing latch opening when the upper housing is installed on the lower housing.

4. The position sensor of claim 2, wherein the potentiometer component is attached circumferentially about the barrel outer surface forming an upper skirt and a lower skirt, the potentiometer component raised above the outer surface of the barrel creating an upper bearing surface between an upper portion of the potentiometer component and the upper skirt and a lower bearing surface between a lower portion of the potentiometer component and the lower skirt, the potentiometer component further including a pair of electrically conductive bands attached to the outer surface of the barrel.

5. The position sensor of claim 4, wherein: the upper housing top portion includes a shoulder surrounding an opening extending through the top portion and the lower housing bottom portion includes a shoulder surrounding an opening extending through the bottom portion, the potentiometer component upper bearing surface arranged to engage the upper housing shoulder with the barrel upper skirt extending to the upper housing top portion and the potentiometer component lower bearing surface arranged to engage the lower housing shoulder with the barrel lower skirt extending through and away from the bottom portion opening and coupled to the shaft, each upper and lower shoulder supporting rotational travel of the barrel within the cavity.

6. The position sensor of claim 4, wherein the electrical subassembly includes a plurality of terminal contacts and the lower housing includes a second outer wall extending from the bottom portion of the lower housing opposite the first outer wall extending to a bottom surface of the upper housing top portion, the second outer wall including an opening extending though the second outer wall to the pair of electrically conductive bands and the electrically resistive band, wherein the electrical sub-assembly is installed in the second wall opening with a respective one of the plurality of terminal contacts engaging a respective conductive band and resistive band.

7. An assembly for measuring the position of a rotating shaft comprising:
   an upper housing;
   a lower housing arranged to be attached to the upper housing;
   a barrel rotationally mounted to the attached upper and lower housings and coupled to the shaft, the barrel positionable within the attached upper and lower housings by the shaft;
   a potentiometer component having a resistive band attached to an outer surface of the barrel; and
   an electrical sub-assembly mounted to the lower housing and electrically connected to the potentiometer component that measures the position of the barrel and in response generates a position signal.

8. The assembly claim 7, wherein:
   the upper housing includes a top portion and a pair of outer walls extending from an outer edge of the top portion and at least one inner wall located inward from and between the pair of outer walls and a cavity defined by the pair outer walls and the at least one inner wall; and
   the lower housing includes a bottom portion and a first outer wall extending from an outer peripheral edge of the lower housing and a pair of inner walls extending from the bottom portion located inward from the first outer wall,
   wherein the upper housing is installed on the lower housing by engaging the pair of outer walls of the upper housing to the pair of inner walls of the lower housing and the first outer wall of the lower housing to the at least one inner wall of the upper housing causing the cavity to extend through the installed upper and lower housings.

9. The assembly of claim 8, wherein:
the pair of upper housing outer walls each include a latch opening and the at least one upper housing inner wall includes a latch member; and
the lower housing first outer wall includes a latch opening and the pair of lower housing inner walls each include a latching member,
wherein the upper housing latch member engages the lower housing latch opening, and each lower housing latch member engages a respective upper housing latch opening when the upper housing is installed on the lower housing retaining the upper housing to the lower housing.

10. The assembly claim 8, wherein the potentiometer component is attached circumferentially about the barrel outer surface located to form an upper skirt and a lower skirt, the potentiometer component raised above the outer surface of the barrel creating an upper bearing surface between an upper portion of the potentiometer component and the upper skirt and a lower bearing surface between a lower portion of the potentiometer component and the lower skirt, the potentiometer component including a first and a second electrically conductive band attached to the outer surface of the barrel, the resistive band electrically connected by end connections to the first and the second conductive bands.

11. The assembly of claim 10, wherein the upper housing top portion includes a shoulder surrounding an opening extending through the top portion and the lower housing bottom portion includes a shoulder surrounding an opening extending through the bottom portion, the potentiometer component upper bearing surface arranged to engage the upper housing shoulder with the barrel upper skirt extending to the upper housing top portion and the potentiometer component lower bearing surface arranged to engage the lower housing shoulder with the barrel lower skirt extending through and away from the bottom portion opening and coupled to the shaft, each upper and lower shoulder supporting the rotational travel of the barrel within the cavity.

12. The assembly of claim 10, wherein the electrical sub-assembly includes:
a first cover portion having an inner surface and a mounting block formed on the first cover portion inner surface;
a first, a second and a third terminal contact mounted to the mounting block, each of the first, second and third terminal contacts including a wiper portion extending from an end of each terminal contact and electrically connected to a wire conductor on an opposite end, the first and the third electrical terminal contact conductors connected to a reference voltage;
a second cover portion extending from the first cover portion for housing and guiding the wire conductors to a respective terminal contact;
a second outer wall extending from the bottom portion of the lower housing opposite the first outer wall extending to a bottom surface of the upper housing top portion, the second outer wall including an opening extending though the second outer wall to the first and second electrically conductive bands and the electrically resistive band, the opening receiving the mounting block to place the wiper portions of the second terminal contact in electrical contact with the resistive band and the first and the third terminal contacts in electrical contact with the first and the second conductive bands to apply the reference voltage to the first and the second conductive bands and to the restive band through the end connections,
wherein upon rotation of the barrel by the shaft the second terminal contact is moved along the resistive band to sense an output voltage that represents the position of the barrel.

13. The assembly of claim 12, wherein the output voltage sensed by the second terminal contact is coupled by the wire conductor connected to the second terminal contact to a control circuit as a position signal representing the position of the barrel.

14. The assembly of claim 7, wherein:
the upper housing includes a top portion having a plurality of holes extending through the top portion and a pair of outer walls extending from an outer edge of the top portion and at least one inner wall located inward from and between the pair of outer walls and a cavity defined by the pair outer walls and the at least one inner wall; and
the lower housing include a bottom portion and a first outer wall extending from an outer peripheral edge of lower housing and a pair of inner walls extending from the bottom portion located inward from the first outer wall each of the pair of inner walls further including a plurality of stakes extending from a top surface of each inner wall,
wherein the upper housing is installed on the lower housing by engaging the pair of outer walls of the upper housing to the pair of inner walls of the lower housing to insert a respective stake into a respective hole on the upper housing top portion and to install the first outer wall of the lower housing to the at least one inner wall of the upper housing causing the cavity to extend through the installed upper and lower housings.

15. The assembly claim 14, wherein each stake has a portion that extends beyond its respective hole that is deformed to retain the upper housing to the lower housing.

16. The assembly of claim 12, wherein the first cover portion includes a pair of holes extending through the first cover portion and the second outer wall includes a pair of stakes extending from the second outer wall, wherein the first cover and the second cover are attached to the lower housing by passing a respective stake through a respective one of the pair of holes and deforming a portion of the stake extending from each hole to retain the cover the lower housing.

17. A rotary position sensor assembly for measuring the position of a rotating shaft comprising:
a lower housing;
a barrel mounted to the shaft and placed in a lower housing;
an upper housing attached to the lower housing that rotatably supports the barrel between the upper and lower housings;
a potentiometer component having at least a resistive band attached on an outer surface of the barrel rotatable with the barrel; and
an electrical sub-assembly mounted to the lower housing and electrically connected to the potentiometer component that together generate a position signal that measures the position of the barrel when the barrel is rotated by the shaft.

18. The rotary position sensor assembly of claim 17, wherein the potentiometer component is attached circumferentially about the barrel outer surface, the potentiometer component including a first and a second electrically conductive band attached to the outer surface of the barrel, the resistive band electrically connected by end connections to the first and the second conductive bands.

19. The rotary position sensor assembly of claim 17, wherein the electrical sub-assembly includes:
- a first, a second and a third terminal contact, each terminal contact including a wiper portion extending from one end and electrically connected to a wire conductor on an opposite end;
- the wire conductors connected to the first and the third electrical contacts connected to a reference voltage;
- the wiper portion of the second terminal contact electrically contacting the resistive band and the first and the third terminal contacts electrically contacting the first and the second conductive bands respectively to apply the reference voltage to the first and the second conductive bands and to the restive band through the end connections,
- wherein upon rotation of the barrel by the shaft, the second terminal contact is moved along the resistive band to sense an output voltage that represents the position of the barrel.

20. The assembly of claim 19, wherein the output voltage sensed by the second terminal contact is coupled by the wire conductor connected to the second terminal contact to a control circuit as a position signal representing the position of the barrel.

* * * * *